United States Patent Office 3,422,939
Patented Jan. 21, 1969

3,422,939
SERVO-CONTROLLED CHANGE-SPEED TRANSMISSIONS OF VEHICLES
Edmond Henry-Biabaud, Paris, France, assignor to Societe Anonyme Andre Citroen, Paris, France
Filed Dec. 19, 1966, Ser. No. 603,004
Claims priority, application France, Dec. 23, 1965, 43,535; Mar. 29, 1966, 55,415
U.S. Cl. 192—3.5                4 Claims
Int. Cl. F16d *67/00;* F16h *3/08, 5/06*

ABSTRACT OF THE DISCLOSURE

Vehicle transmission system comprising a stepped-ratio change-speed mechanism with a least one gear-engaging sliding hub actuatable by means of a fork, a disconnecting clutch actuatable during gear changes by means of a control relay, and a fork control servo-mechanism, wherein a control play is provided between said fork and said sliding hub, and members operatively connected to said fork for actuating said clutch control relay, said members being so positioned in relation to said clutch that when a gear ratio is disengaged the initial stroke of the fork which corresponds to said control play is effective to actuate said relay in the direction to cause the disengagement of said disconnecting clutch.

---

Figure 1:
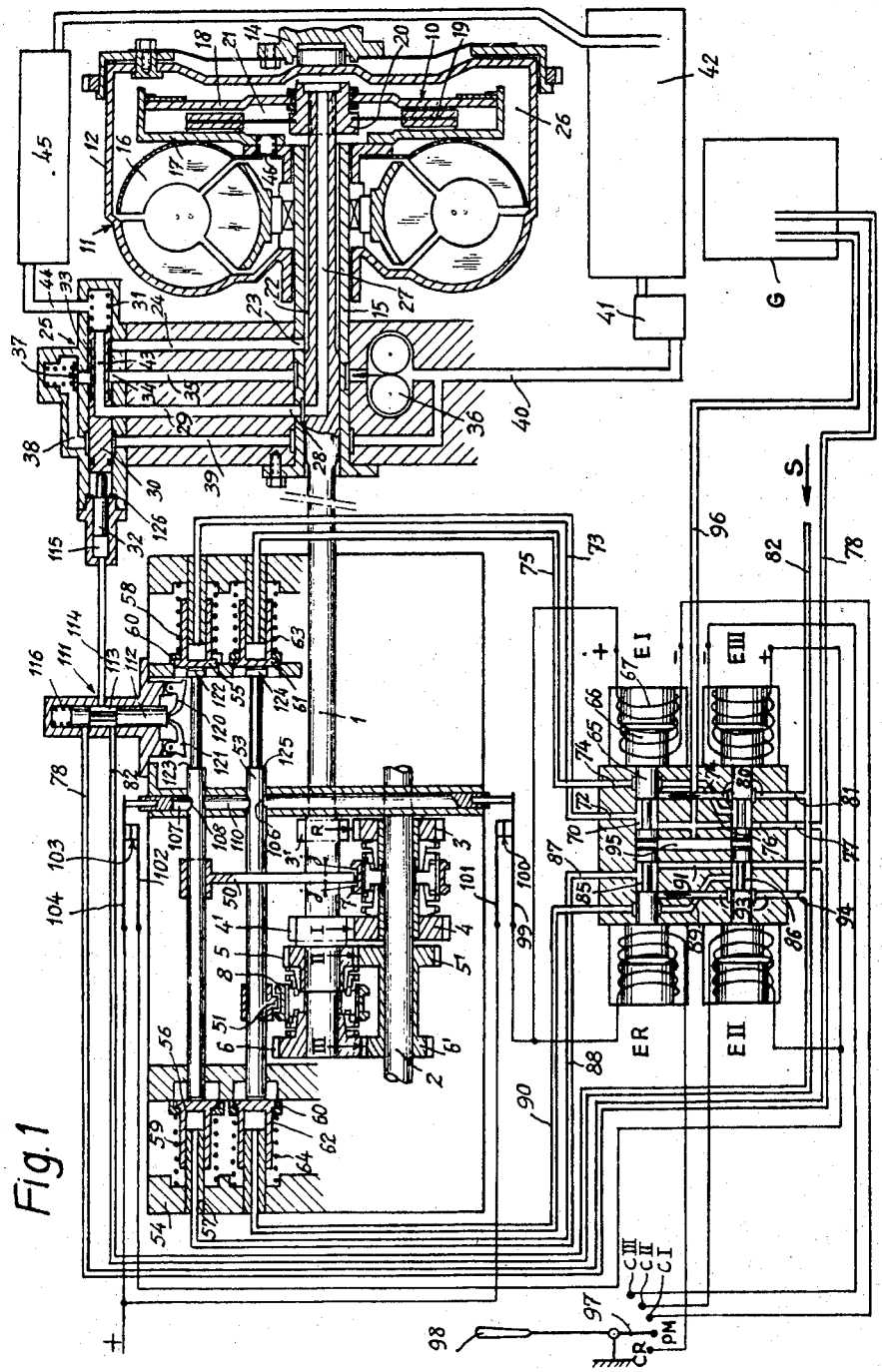

This invention relates to a specific design of transmission system of vehicles comprising a servo-controlled change-speed mechanism, and more particularly a change-speed mechanism providing increasing gear ratios with at least one sliding hub for engaging the selected gear which is actuatable by means of a fork responsive to servo-action control means, the system also comprising a disconnecting clutch adapted to be actuated by means of a control relay when changing speed.

This invention is concerned primarily with an arrangement whereby the desirable synchronism between the sliding hub actuation and the clutch actuation is obtained in a simple and reliable manner, and with this end in view this arrangement is characterised essentially in that there is provided a certain control play or free motion between the fork and the sliding hub, and also, associated with said fork, members for actuating said clutch control relay which are so disposed in relation to said clutch that when a gear is disengaged the initial movement of the fork which corresponds to said play or free motion is used for actuating said relay in the direction to disengage said disconnecting clutch, whereby the disengagement takes place in the absence of any rotary driving torque, said relay being normally actuated in the clutch-engagement direction at the end of said movement of the fork corresponding to the engagement of a gear.

This invention is also concerned with a more specific form of embodiment comprising at least two gear control forks servo-controlled by pressure-fluid operated devices responsive to solenoid-operated distributor valves, and in this specific arrangement there is provided for each fork an electrical contact inserted in the circuit controlling the relevant solenoid-operated valve which constitute a detector for the position of the other fork so that the electrical control circuit of one fork cannot become operative unless the other fork is in its neutral position. In the spirit of this form of embodiment the fluid-pressure operated devices may be of the single-acting type for engaging separately a given gear, the forks being on the other hand urged by adequate return means to their neutral position.

According to a further development of the present invention, in a vehicle transmission system of the type set forth hereinabove which comprises a gear selector movable between a plurality of stable positions in which it is adapted to co-act with said electrical contacts controlling the solenoid-operated valves, there is provided, between said stable selector positions, auxiliary electrical contacts adapted to be engaged by said selector during its movement from one stable position to another, said auxiliary contacts being connected to a holding relay comprising a holding contact responsive to the condition of said disconnecting clutch and adapted to keep said relay energised as long as the clutch engagement condition is maintained, said relay further comprising a back contact inserted in the circuit of the solenoid-operated valves whereby these valves become operative to engage a gear only at the end of the relay holding period, that is, in the fully disengaged condition of said disconnecting clutch.

Figure 2:
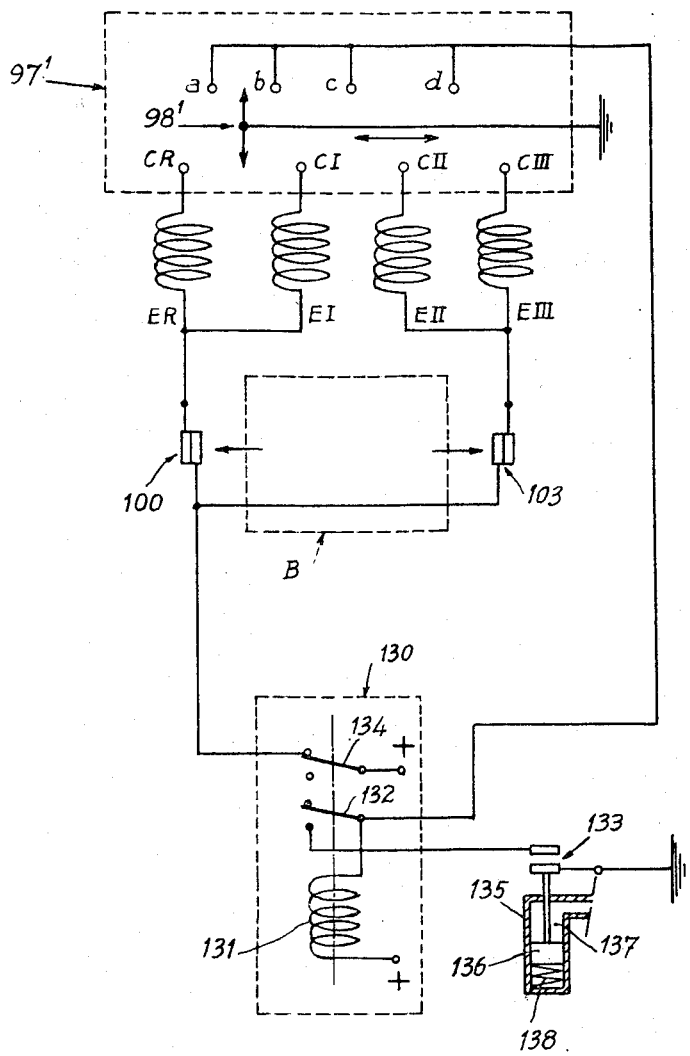

A specific form of embodiment of the invention is described hereinafter by way of example with reference to the accompanying drawings, in which:

FIGURE 1 illustrates diagrammatically a transmission system according to this invention with a servo-controlled change-speed mechanism, and FIGURE 2 is a wiring diagram showing the arrangement for controlling the solenoid-operated valves of the change-speed mechanism of FIGURE 1.

The transmission arrangement illustrated in the drawings comprises a gear-type change-speed mechanism shown only in diagrammatic form therein, with its input shaft 1 and output shaft 2 carrying four pairs of intermeshing gears 3, $3^1$; 4, $4^1$; 5, $5^1$ and 6, $6^1$. Each pair of gears comprises a loosely rotating pinion adapted to be rotatably fastened to its relevant shaft by means of a conventional-type sliding hub, that is, a sliding hub 7 associated with gears 3 and 4, and sliding hub 8 associated with gears 5 and 6. The sets of gears 4, $4^1$; 5, $5^1$ and 6, $6^1$ constitute constant-mesh gearings providing respectively the low or first speed I, the intermediate or second speed II and the top or third speed III, the other gears 3, $3^1$ being interconnected through a reversing pinion (not visible in the drawing) to constitute therewith the conventional reverse gearing R.

The input shaft 1 of the change-speed mechanism is connected to a friction clutch 10 acting as a disconnecting clutch incorporated in this example in a torque converter 11 of which the case 12 carrying the pump vanes 13 is connected to the engine shaft 14 and rotatably mounted on a fixed hollow hub 15 receiving said input shaft 1. The turbine or driven member of the torque converter is connected to the bell-shaped member 17 of clutch 10 receiving an axially movable plate 18 for clamping or releasing a friction disk 19 having its hub 20 rigidly connected to the end of shaft 1. The bell-shaped member 17 and plate 18 constitute together and about the hubs 15 and 20 a fluid-tight chamber 21 communicating through an annular passage 22 formed between the shaft 1 and hub 15 with a passage 23 thereof connected through a radial duct 24 to a pressure fluid distributor designated as a whole by the reference numeral 25. The case 12 of the torque converter constitutes about the aforesaid chamber 21 another chamber 26 communicating through a passage 27 formed in said input shaft 1 with an annular groove and a hub passage 28 leading in turn through a radial duct 29 to said distributor 25.

This distributor 25 comprises a slide valve 30 having one end urged in an axial direction by a coil compression spring 31 and the other end responsive to a control piston 32 actuatable by means of a fluid under pressure as will be explained presently. The slide valve 30 comprises an annular groove 33 constantly connected to a port 34 of said distributor which is connected through a radial duct 35 to the delivery side of an oil pump 36 adapted to supply fluid under pressure, through the aforesaid distributor groove 33, either to the chamber 21 of clutch 10 via the radial duct 24 (to provide the clutch disengagement) or to the chamber 26 of the torque converter via the radial duct 29 (to engage the clutch). A relief valve 37 incorporated in the distributor 25 is connected through ducts 38 and 39 to the suction side 40 of the pump which is connected on the other hand through a filter 41 to the oil reservoir 42.

The slide valve 30 comprises an internal duct 43 adapted to connect the chamber 26 to the exhaust line via the aforesaid radial duct 29 in the distribution position illustrated which corresponds to the clutch disengagement, by means of a duct 44 connecting in this case the distributor 25 to a cooling radiator 45 inserted in the return line to the reservoir. The chamber 26 is further provided with a relief valve 46 of the torque converter which opens into the other chamber 21 adapted during the clutch engagement period, to communicate via the duct 24 with the return line to the reservoir through the cooling radiator 45.

The sliding hubs 7 and 8 of the change-speed mechanism are controlled by means of a pair of conventional forks 50 and 51 solid respectively with rods 52 and 53 slidably mounted in the cover of the change-speed mechanism shown in diagrammatic from at 54. These forks are engaged in the corresponding grooves of the sliding hubs with a certain play shown in the drawing as a bilateral clearance j in the inherent neutral position of the sliding hub.

The aforesaid rods 52 and 53 have their ends responsive to the action of the pistons of single-acting hydraulic cylinders and to return springs adapted to hold in and return to their neutral position the corresponding fork and rod. Thus, rod 52 is responsive to a pair of hydraulic pistons 55, 56 slidably mounted about feed ducts 57 secured in the cover 54 of the change-speed transmission case. These pistons are responsive to return springs 58, 59 prestressed in the position shown in the drawing, said springs bearing with one end against said cover 54 and with the opposite end against shoulders formed on said pistons, through the medium of collars 60 abutting against said cover 54 in the aforesaid neutral position.

The other bar 53 is likewise responsive to a pair of hydraulic pistons 61, 62 urged in turn by a pair of return springs 63 and 64.

These hydraulic pistons are fed with fluid under pressure by means of separate solenoid-operated valves shown in this specific form of embodiment as being incorporated in a single distributor unit and designated by the reference symbols EI, EII, EIII and ER corresponding respectively to the low, intermediate and top speeds, and to the reverse gear, which are engaged when the corresponding solenoid is energised.

Each solenoid-operated valve comprises a slide valve 65 connected to the movable core 66 of an electromagnet having its solenoid designated by the reference numeral 67. In the assembly illustrated the slide valves 65 of solenoid-operated valves EI and EIII comprise respectively an annular groove 70, 71 constantly communicating the former via a duct 72 with a pipe line 73 leading to the hydraulic piston 55 and the latter via a duct 74 with another pipe line 75 leading to the other hydraulic piston 61, both grooves being normally connected via a common duct 76 to a pipe line 77 leading to a general exhaust line 78. Moreover, each groove 70 and 71 can be connected by properly displacing the relevant slide valve to a common duct 80 supplying fluid under pressure and connected in turn through a duct 81 to a general pressure-fluid delivery line 82.

Similarly, the slide valves 65 of solenoid-operated valves ER and EII are formed respectively with an annular groove 85, 86 constantly communicating the former via a duct 87 with a pipe line 88 leading to the hydraulic piston 56, and the latter via a duct 89 with another pipe line 90 leading to the hydraulic piston 62, both grooves communicating via a common duct 91 with a pipe line 92 leading to the aforesaid general exhaust line 78. Moreover, each groove 85, 86 is adapted to be connected by moving the corresponding slide valve to a common duct 93 delivering oil under pressure, this duct 93 being connected via a pipe line 94 to the general supply line 82 delivering oil under pressure.

Furthermore, these solenoid-operated valves comprise a common leakage collector 95 connected to a recovery line 96 leading in turn, like the general exhaust line 78, to a general reservoir G to which a source of pressure (not shown) is connected to deliver fluid under pressure to the line 82 as shown by the arrow S.

The solenoid-operated valve may be selectively operated for example from an electrical switch 97 having several positions and comprising in this example a hand control lever 98 connected to the negative terminal of a source of current and co-acting outside its PM position (corresponding to neutral) with a set of four contacts CR, CI, CII, CIII electrically connected respectively with one of the terminals of the solenoid-operated valves ER, EI, EII and EIII.

The other terminals of the solenoid-operated valves EI and ER are electrically connected to the movable arm 99 of a contact 100 having its other arm 101 connected to the positive terminal of the source of current.

The other terminals of the solenoid operated valves EII and EIII are electrically connected to the movable arm 102 of a contact 103 having its other arm 104 connected to the positive terminal of the source of current.

Co-acting with the arm 99 of contact 100 is one end of a control rod 105 sliding in the cover 54, the other end of this rod co-acting with a groove 106 of rod 53 which constitutes a cam means for controlling the rod 105 so that the contact 100 can be closed only in the neutral position of rod 53.

In a similar manner one end of a control rod 107 co-acts with the arm 104 of contact 103, this rod 107 having its other end engaged in a groove 108 or rod 52 which constitutes the cam means controlling said rod 103, whereby the contact 103 can be closed only in the neutral position of this rod 52.

Mounted between the rods 52 and 53 is an interlocking device comprising a spring-loaded bolt 110 adapted to co-act with the aforesaid grooves 106 and 108 whereby these two rods cannot move simultaneously to a gear engaging position, and this movement of one rod cannot take place unless the other rod is in its neutral position.

Moreover, both rods 52 and 53 co-act with a clutch control relay 111 adapted to synchronise the disconnections ensured by said clutch 10 with the actual gear changes of the transmission, this relay being in this example of the hydraulic type and adapted to control the action of the control piston 32 of distributor 25. It comprises a slide valve 112 formed with an annular groove 113 constantly communicating with a pipe line 114 connected to the control chamber 115 of piston 32. According to the position of this slide valve, the groove 113 may provide a fluid communication between the pipe line 114 and either the duct 82 for the supply of oil under pressure or the exhaust pipe line 78.

The slide valve 112 is normally urged to the position shown in the drawing by a spring 116 bearing against a pair of control levers 120, 121 fulcrumed on the distributor body and adapted to engage shoulders 122, 123 and 124, 125 formed respectively on rods 52 and 53; in this respect it may be pointed out that it is only for the sake of clarity in the illustration of the elements concerned that the rod 53 and levers 120, 121 are shown in a relative spacing, but it is obvious that these parts can be arranged to co-act mutually as in the case of rod 52 visible in the figure.

This transmission arrangement operates as follows:

Assuming that the engine is running, the vehicle being at a standstill, with the lever 98 in its neutral position, it is clear that the solenoid operated valves EI, EII, EIII and ER are de-energised. The slide valves 65 of these valves are urged by return springs (not shown) to the position shown in the drawing whereat the fork-controlling hydraulic pistons 55, 56, 61 62 are in fluid connection with the general exhaust line 78, that is, in the return position shown in the drawing and corresponding to the neutral as to the corresponding neutral position of forks 50, 51 and sliding hubs 7 and 8. Under these conditions, the hydraulic relay 111 is also in the position shown in the drawing whereat it connects the pressure-fluid line 82 to the pipe line 114; in other words, the distributor 25 is in the position illustrated in the drawing (with the piston 32 abutting against the stop washer 126) whereat the pressure-fluid duct 35 is connected via ducts 24 and 22 to the chamber 21 of friction clutch 10, the latter being disengaged.

The first or low gear is engaged by moving the lever 98 of switch 97 to the contact CI, thus causing the energisation of the solenoid operated valve EI of which the slide valve will thus close the port leading to duct 76 while opening the pressure-fluid port 80 which is thus connected via duct 72 and pipe line 73 to the chamber controlling the piston 55. The latter moves the rod 52 and therefore fork 50 and sliding hub 7 to the position in which the dogs of this hub engage those of gear 4 in gearing 4, $4^1$ to provide the first or low gear ratio.

When the sliding hub 7 initiates its actual dog- or mesh-engaging stroke with respect to gear 4, the shoulder 122 of rod 52 actuates the lever 120 of relay 111 and thus moves the slide valve 112 to the position in which it closes the port of duct 82 while opening the communication between duct 114 and the exhaust pipe line 78. The sliding member of distributor 25 is then moved by spring 31 to the position in which the pressure-fluid duct 35 is connected to duct 29; in other words, the fluid under pressure is admitted via the duct 27 into the chamber 26 of the torque converter, while the duct 24 or the chamber 21 of clutch 10 is connected with the duct 44 returning the fluid to the reservoir. Thus the friction clutch 10 connects the converter to the shaft 1 in synchronism with the aforesaid meshing movement, in conjunction with on the one hand the opening of contact 103 (to prevent the energisation of the solenoid operated valves EII and EIII controlling the other rod 53) and on the other hand the compression of the return spring 59 of rod 52.

Any speed change requiring the operation of both control forks takes place in the exemplary manner set forth hereinafter in connection with the engagement of the intermediate or second speed following the engagement of the low or first speed. This engagement is obtained by moving the switch lever 98 to position CII, thus causing firstly the de-energisation of the solenoid of valve EI but not the energisation of the solenoid of valve EII as a sequence of the opening of contact 103. The sliding member of solenoid operated valve EI is thus returned to its inoperative position illustrated in the drawing, whereat the control chamber of piston 55 is connected to the exhaust, whereby the return spring 59 acting upon the opposite piston 56 will return the rod 52 and therefore the fork 50 associated therewith to the neutral position illustrated in the drawing. Considering the fact that this fork 50 was previously bearing against the left-hand side (as seen in the drawing) of the groove formed in sliding hub 7 thus pushed to its meshing position the rod 52 and this fork are initially restored alone to their neutral position and will carry along the sliding hub 7 only after the complete play of value $2j$ existing between the fork and the groove of said sliding hub has been taken up. This play $2j$ is so calculated that the shoulder 122 of rod 52, when said play is taken up, permits the return of lever 120 together with the slide valve 112 of relay 111 to the position shown in the drawing, thus leading, as already explained hereinabove, to the position illustrated of distributor 25, with the consequence that the friction clutch 10 is disengaged. Under these conditions, the actual dog disengagement between gear 4 and sliding hub 7, which begins after the initial movement $2j$ of fork 50, will take place automatically without any rotational driving torque between the gear and the sliding hub, the only stress produced resulting from the force of spring 59. Then, upon completion of the movement to neutral position of sliding hub 7 (and therefore of fork 50 and rod 52), the contact 103 is re-closed and thus permits the energisation of the valve solenoid EII, considering the fact that lever 98 is engaging the switch contact CII. Subsequently, it is the other piston 62 that will be actuated by the fluid under pressure delivered through the solenoid operated valve EII, whereby rod 53 and fork 51 will carry along the sliding hub 8 to the position of dog engagement with gear 5 of the second or intermediate speed gearing 5, $5^1$. As in the first or low-speed engagement, it is only when this dog engagement of this second or intermediate speed is effective that the shoulder 125 of rod 53 will actuate the lever 121 of relay 111, thus restoring the slide valve 112 to the position interconnecting the pipe lines 78 and 114. In other words, the distributor 25 will be restored to the above-defined position in which the converter is supplied with fluid under pressure, this being attended by the clamping of the clutch disk 10 in order to restore the transmission of torque between the converter and the input shaft 1, and therefore between this shaft 1 and the shaft 2 through the pair of gears 5 and $5^1$. At the end of the engagement of this gear ratio, contact 100 is open (thus preventing the energisation of valve solenoids EI and ER controlling the rod associated with the other fork), while the return spring 63 of rod 53 is compressed and ready to act in case of de-energisation of the valve solenoid EII which corresponds to any other controlled gear change.

Any gear change involving the use of the same fork takes place more simply than in the case of a change involving the switching from one fork to the other fork, as will be explained hereinafter in connection with the engagement of the third or top speed following the engagement of the second or intermediate speed.

The top or third speed is engaged by moving the switch lever 98 to position CIII. This is attended not only by the de-energisation of solenoid valve EII and by the opening of the communication between the control chamber of piston 62 and the exhaust line, but also by the immediate energisation of the solenoid valve EIII, due to the previous closing of contact 103, and also by the delivery of fluid under pressure into the control chamber of piston 61 which will also be urged to its neutral position by the return spring 63.

Initially, and as already explained hereinabove, whenever a gear ratio is disengaged the taking up of play $2j$ between the fork 51 and sliding hub 8 corresponds to the movement of shoulder 125 of rod 53 away from lever 121, that is, to the monitoring by relay 11 of distributor 25 thus moved to the position causing the disengagement of clutch 10, the dog disengagement taking place thereafter in the absence of any rotary driving torque.

Then the control piston 61 actuates alone the rod 53 beyond the neutral position against the force of return spring 64 until the dogs of sliding hub 8 drivingly engage those of pinion 6 of the third or top speed (gearing 6, $6^1$). During this final dog engagement the shoulder 124 of rod 53 actuates the lever 120 to move the slide valve of relay 111 to its distributor monitoring position corresponding to the re-engagement of clutch 10, thus restoring the transmission of the torque through the freshly engaged gear ratio.

It will be noted that the type of speed selector switch 97 shown in diagrammatic form in the drawing does not imply that the speeds must compulsorily be engaged in succession in the up or down direction; in other words, the contacts CR and CI to CIII may be disposed and the change-speed lever 98 moved for example according to a conventional selector gate comprising a central transverse neutral line.

Besides, the use of a manual control switch for selecting gear ratios should not be construed as limiting the invention as this speed selecting function by means of electrical contacts corresponding to the desired gear ratios may also be obtained automatically by means of one of the well known, so-called governor devices usually incorporated in automatic transmission systems.

It is also obvious that outside the example shown and described herein the servo-control system of this invention is also applicable to any automatic clutch types other than torque converters, for example those incorporating a centrifugal starting clutch, or an electromagnetic clutch, this invention being also applicable to any type of disconnecting clutch which differs from the one illustrated herein in combination with a converter, for example an electromagnetic disconnecting clutch, the control relay of this last-named clutch (which is operatively connected to each fork control member) being in this case of the electrical type instead of the pressure-fluid type as shown at 111 in the drawing.

A specific arrangement utilizing a manual control switch for selecting gear ratios is illustrated in FIGURE 2.

In this figure, B is the change-speed mechanism of a transmission of the type described hereinabove, which provides four ratios selectively engageable by energising solenoid valves ER, EI, EII or EIII of which only the solenoid coils are illustrated diagrammatically, these coils corresponding to the reverse, low speed, intermediate speed and top speed.

The circuit of solenoids ER and EI controlling in this arrangement a sliding-hub fork in the change-speed mechanism comprises a contact 100, and the circuit of solenoids EII and EIII controlling another sliding hub fork comprises a contact 103, these contacts 100 and 103 constituting as already explained means for detecting the fork position and being so arranged that one fork cannot be operated unless the other fork is in its neutral position.

The gear ratio selector is shown diagrammatically in the form of an electrical switch $97^1$ having four contact studs CR, CI, CII and CIII connected respectively to the solenoid valves ER, EI, EII and EIII. These contacts may be selectively connected to the negative terminal of a source of current through the medium of a lever $98^1$ having four stable positions of engagement on these contacts, plus an inoperative neutral position as shown in the drawing.

Between these stable positions of lever $98^1$, four contacts $a, b, c$ and $d$ are provided and adapted to be likewise engaged by the lever $98^1$ so as to temporarily connect them to the negative terminal of the source of current when said lever is moved to any one of said stable positions in which it closes the relevant contact CR, CI, CII or CIII. The arrangement and number of the additional intermediate contacts $a, b, c$ and $d$ may differ according to the design of the change-speed mechanism; thus, more particularly, contacts $a$ and $b$ may form a same and single contact if the changes from neutral to low speed and to reverse take place in the same direction. These contacts are jointly connected to a relay 130 having a coil 131 connected to the positive terminal of the source of current, 132 denoting a front contact connected on the other hand to a holding contact 133; in addition, a back contact 134 is inserted in the solenoid circuit, and more particularly on the circuit line connecting the valve solenoids to the positive terminal of the source of current.

The holding contact 133 is responsive to the condition of the disconnecting clutch and constitutes in this case part of a pressure-responsive contact device comprising a cylinder 135 and piston 136 having its chamber 137 connected to the fluid clutch control means of FIGURE 1, for example to the duct 24 of this figure. The piston 136 is responsive on the one hand to a spring 134 tending to close contact 133 and on the other hand, in chamber 137, to the pressure of the control fluid adapted to disengage the connecting clutch.

This control system operates as follows:

When the control lever $98^1$ is moved to one of its stable positions in which one of contacts CR, CI CII or CIII is closed to engage the corresponding gear ratio, notably from the position providing another gear ratio, it engages during this movement one of the other contacts $a, b, c$ or $d$ whereby relay 130 is energised and back contact 134 remains open before the selected contact CR, CI, CII or CIII to be engaged by the lever is closed, whereby the corresponding solenoid will not be energised even if the relevant contact 100 or 103 is closed, as long as relay 130 is energised, as a consequence of the closing of its front contact 132, and as long as the holding contact 135 itself is closed, that is, as long as the pressure-responsive contact does not receive a pressure corresponding to the actual disengagement of the disconnecting clutch. When this pressure is attained it opens the contact 133, thus de-energising relay 130 and closing contact 134, whereby the solenoid valve of which the corresponding control contact was closed by switch lever $98^1$ can then be energised to cause the engagement of the corresponding gear ratio, with the certainty that the disconnecting clutch is effectively and completely disengaged.

Of course, the nature of the contact responsive to the condition of the disconnecting clutch may vary as a function notably of the nature of this clutch.

I claim:

1. A transmission system having a stepped-ratio change speed machanism comprising a gear-engaging sliding hub, a fork for actuating said hub, said fork and said sliding hub having a control play between them, a disconnecting clutch for said mechanism, a clutch control relay for operating said clutch, a control servo-mechanism for said fork, means connected to said fork for actuating said clutch control relay so that when a gear ratio is disengaged the initial stroke of said fork corresponding to said control play is effective to actuate said relay to cause a disengagement of said disconnecting clutch whereby said disengagement takes place subsequently in the absence of any rotary driving torque and said relay being normally actuated to engage said clutch at the end of a movement of said fork.

2. A transmission according to claim 1, comprising two forks, a supply of fluid under pressure and said control servo-mechanism comprises a second means responsive to said fluid for actuating said fork, solenoid operated valves for distributing said fluid to said second means associated with each of said forks, an electrical control circuit for said valves, an electrical contact inserted in the electrical control circuit of the relevant solenoid operated valves for detecting the position of the other fork, whereby the electrical circuit controlling one fork cannot be rendered operative unless the other fork is in its neutral position.

3. A transmission according to claim 2, wherein said second means are of the single-acting type in order separately to engage a selected gear ratio and return means for said forks urging them to neutral position.

4. A transmission according to claim 1, wherein said control servo-mechanism comprises an electrical circuit, solenoid operated valves in said circuit, a gear selector displaceable between a plurality of fixed positions engaging electrical contacts in said circuit controlling said solenoid valves, auxiliary contacts in said circuit located between said fixed positions to be engaged by said selector during its movement from one fixed position to another fixed position, a holding relay connected to said auxiliary contacts having a holding contact responsive to the condition of said disconnecting clutch to hold said relay as long as said disconnecting clutch is engaged, said relay comprising a back contact inserted in said circuit to prevent the energization of said solenoid operated valves for engaging a corresponding gear ratio until said disconnecting clutch is actually disengaged.

References Cited

UNITED STATES PATENTS

| | | | |
|---|---|---|---|
| 2,943,719 | 7/1960 | McNamara et al. | 192—3.5 |
| 2,955,691 | 10/1960 | Brueder | 192—3.5 |
| 3,039,321 | 6/1962 | Weymann | 192—3.5 |
| 3,103,826 | 9/1963 | Jaeschke | 192—3.5 |
| 3,280,657 | 10/1966 | Holdeman | 193—3.5 |

DONLEY J. STOCKING, *Primary Examiner.*

HENRY S. LAYTON, *Assistant Examiner.*

U.S. Cl. X.R.

74—335, 364, 365